United States Patent [19]

Takahashi et al.

[11] 4,066,963
[45] Jan. 3, 1977

[54] SYNCHRONIZATION SYSTEM OF THE CINE-PROJECTOR WITH THE SOUND TAPE REPRODUCER

[75] Inventors: Kiyoshi Takahashi, Kunitachi; Hiroyuki Takimoto, Tokyo; Takashi Yamada, Yokohama; Takashi Itani, Yokohama; Akira Ashida, Yokohama; Kuniyoshi Suzaki, Tokyo, all of Japan

[73] Assignee: Canon Kabushiki Kaisha, Tokyo, Japan

[21] Appl. No.: 667,448

[22] Filed: Mar. 16, 1976

[30] Foreign Application Priority Data

Mar. 24, 1975 Japan .................................. 50-35178

[51] Int. Cl.² ............................................. G03B 31/00
[52] U.S. Cl. ........................................ 352/12; 352/14; 352/17; 352/31
[58] Field of Search ....................... 352/12, 14, 15, 16, 352/17, 20, 23, 24, 31

[56] References Cited

U.S. PATENT DOCUMENTS

| | | | |
|---|---|---|---|
| 3,244,469 | 4/1966 | Hennessey | 352/14 |
| 3,588,558 | 6/1971 | Levin | 352/17 |
| 3,597,056 | 8/1971 | Sasaki | 352/14 |
| 3,694,060 | 9/1972 | Tadie | 352/14 |
| 3,900,251 | 8/1975 | Doyle | 352/31 |
| 3,901,590 | 8/1975 | Ashida | 352/14 |

Primary Examiner—Monroe H. Hayes
Attorney, Agent, or Firm—Toren, McGeady and Stanger

[57] ABSTRACT

The present invention relates to a synchronization system of a cine-projector with a sound tape reproducer. It is characterized in that the phase of a signal corresponding to the film feeding speed of the film projector and that of a signal corresponding to the standard speed coming from the sound tape reproducer are compared with each other so as to control the film feeding speed of the cine-projector by means of the comparison output corresponding to the phase difference. In order to accomplish this, between the driving source for driving the internal mechanism of the cine-projector and the driving member for the internal mechanism, a transmission speed varying mechanism is provided in such a manner that the transmission speed varying mechanism is controlled by means of the film speed control driving source to be driven by the comparison output so as to maintain the synchronized state.

11 Claims, 6 Drawing Figures

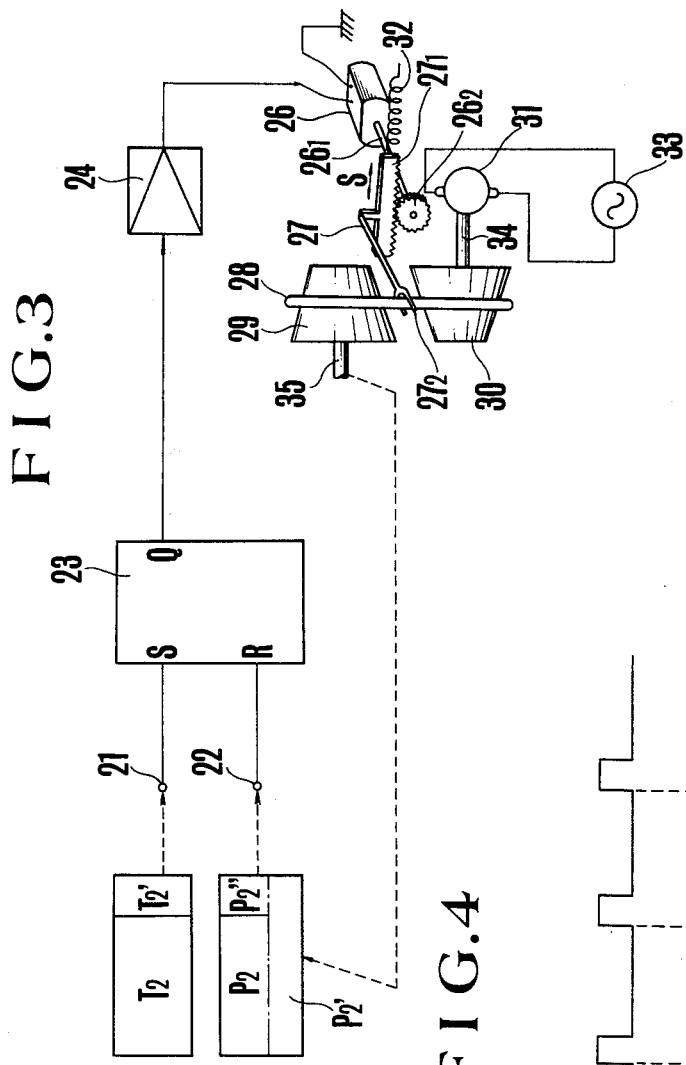

SYNCHRONIZATION SYSTEM OF THE CINE-PROJECTOR WITH THE SOUND TAPE REPRODUCER

BACKGROUND OF THE INVENTION

1. Field of the Invention

The present invention relates to a synchronization system of the cine-projector with a the sound tape reproducer.

2. Description of the Prior Art

In order to reproduce the sound recorded by the magnetic sound recording device in synchronization with the pictures projected by means of a cine-projector, it is necessary to drive the cine-projector and the sound tape reproducer in synchronization with each other, for which purpose various methods have so far been proposed. Namely, the pulse synchronization method used as a synchronization system of the cine-projector with the sound tape reproducer is considered comparatively of high efficiency. In the case of this synchronization method, when the sound is recorded in the sound recording tape while the pictures projected with the same speed as that of the pictures photographed by a cine-camera is observed, one pulse signal is produced per picture and recorded in the control track of the sound recording tape, in such a manner that by means of reproducing the sound signal recorded on another track simultaneously with the control pulse recorded on the control track, this pulse signal is compared with the pulse signals per picture directly obtained from the cine-projector so as to obtain the synchronized operation. In the case of this pulse synchronization system, when the film feeding of the cine-projector is advanced or delayed by more than one picture as compared with the pulses coming from the sound tape reproducer, the restoration is in principle impossible. In order to eliminate such a shortcoming, various methods have been proposed, whereby the synchronization between the film and the sound recording tape is established by counting the difference between the number of the pulses coming from the cine-projector and that of the pulses coming from the sound tape reproducer by means of a counter so as to control the film speed of the cine-projector in such a manner that the counted difference is maintained constant.

In the case of either of the above mentioned methods, the mean electrical power supplied to the film driving motor is controlled in accordance with the film speed of the cine-projector and therefore it is necessary that the film driving motor of the cine-projector of these methods should have a large starting torque and a quick response to the variation of the source voltage, while the moment of inertia of the whole film driving system should be small. In consequence, not only is the design of such device difficult but also the cost of the product is unavoidably increased, which is quite inconvenient.

SUMMARY OF THE INVENTION

The first purpose of the present invention is to provide a new synchronization system of a cine-projector with a sound tape reproducer, eliminating shortcomings of the conventional synchronization system.

The second purpose of the present invention is to provide a synchronization system of a cine-projector with a sound tape reproducer having a remarkably stabilized synchronization between the cine-projector and the sound tape reproducer.

Further other purposes of the present invention will be disclosed in the following detailed explanation as well as the accompanying drawings.

BRIEF DESCRIPTION OF THE DRAWINGS

FIG. 3 shows a circuit diagram illustrating the principle of an embodiment of the synchronization system of the cine-projector with the sound tape reproducer in accordance with the present invention.

FIG. 4 shows wave forms for explaining the operation of the synchronization system shown in FIG. 3.

DESCRIPTION OF THE PREFERRED EMBODIMENTS

Figure 1:
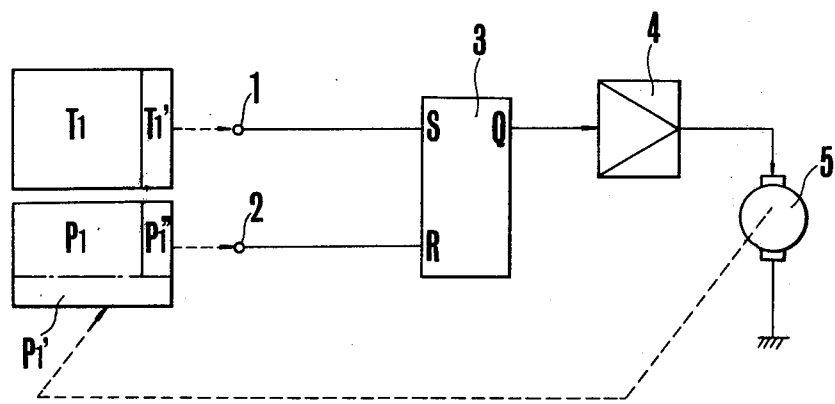
FIG. 1 shows a circuit diagram showing the principle of the conventional pulse synchronization system.

Below, the principle of the conventional pulse synchronization system of the cine-projector with the sound tape reproducer and that of the synchronization system of the cine-projector with the sound tape reproducer will be explained in accordance with several embodiments shown in the drawing.

Figure 2:
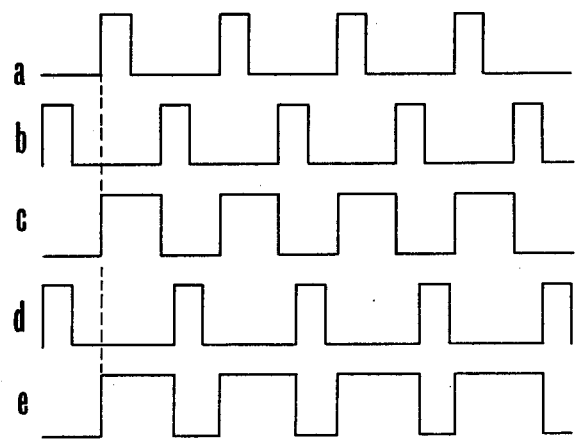
FIG. 2 shows wave forms for explaining the synchronization control in accordance with the device shown in FIG. 1.

FIG. 1 shows a circuit diagram indicating the principle of the conventional pulse synchronization system. In the drawing, 1 is the input terminal of the control pulse reproduced out of the control circuit of the sound tape reproducer $T_1$, which includes a pulse generating mechanism $T_2$ for producing pulses corresponding to the speed of the sound recording tape. Thus, for example, when about 18 pictures are projected per second the control pulses are produced which are synchronized with 18 Hz. 2 is the input terminal of the pulse signal from the cine-projector $P_1$, which includes the pulse generating mechanism $P_1''$ for producing pulses corresponding to the speed of the film. One pulse is produced per picture in such a manner that the pulses are produced alternatively, being synchronized with 18 Hz similar to the sound pulses from the input terminal 1. FIG. 2 shows wave forms for explaining the synchronization control in accordance with the device shown in FIG. 1, whereby (a) is the wave form of the sound pulses while (b) is that of the picture pulses and, in this state, both are produced alternatively with 18 Hz. The sound and the picture pulses are supplied to the Flip-Flop 3 in such a manner that the sound pulses carry out the setting while the picture pulses carry out the resetting. In consequence, at the output of the Flip-Flop 3, square-shaped signals as shown in FIG. 2(c) are produced, which signals present a pulse width determined by the rise time phase of the above mentioned pulses. This output is amplified by the power amplifier 4, so as to drive the film driving motor 5 by means of the mean output. When the sound pulses and the picture pulses are alternatively produced with the same phase relation as shown in (a) and (b), the pulse width of the output c of the Flip-Flop does not vary and therefore the mean power supplied to the motor 5 does not vary so that the film driving motor 5 rotates at a constant speed in such a manner that synchronization is obtained between the film and the sound tape driving. If for some reason the load torque of the motor 5 is increased and the number of rotations of the motor 5 is decreased, the picture pulses produced from the cine-projector are delayed in the producing phase as shown in (d) in FIG. 2. In consequence, the width of the output pulses of the Flip-Flop 3 to be reset by the picture pulses varies as is shown in (e) of FIG. 2. This power is supplied to the film driving motor 5, so as to increase the number of rotations of the motor and to resume the initial state. In the case contrary to the above, the number of rotations of the film driving motor is increased, the mean power supplied to the motor is decreased so as to reduce the number of rotations of motor and to resume the initial state. This is the operation of the conventional synchronization system shown in FIG. 1.

FIG. 3 shows a circuit diagram indicating the principle of an embodiment of the synchronization system of the cine-projector with the sound tape reproducer in accordance with the present invention. In FIG. 3, $T_2$ is the sound tape reproducer including a pulse generating mechanism $T_2$ for producing pulses corresponding to the sound tape speed, $P_2$ the cine-projector including a pulse generating mechanism $P_2''$ for producing pulses corresponding to the film speed, $P_2'$ the film driving mechanism of the cine-projector $P_2$. 21 is the input terminal of the control pulses reproduced out of the control track of the sound tape reproducer $T_2$, whereby as in the case of sound tape reproducer $T_1$ used in the conventional system shown in FIG. 1, when about 18 pictures are projected per second, the pulses are produced which are synchronized with 18 Hz. 22 is the input terminal of the pulse signal from the cine-projector $P_1$, whereby one pulse is produced per picture in such a manner that the pulses are produced alternatively, being synchronized with 18 Hz similarly to the sound pulses from the input terminal 21. 23 is the Flip-Flop, having a set terminal S, with which the input terminal 21 of the control pulse reproduced out of the control track of the sound tape reproducer $T_1$ is electrically connected, and having a reset terminal R, with which the input terminal 22 of the pulse signal from the cine-projector $P_1$ is electrically connected and having an output terminal Q, with which the input terminal of the amplifier 24 is electrically connected. 26 is the film speed control motor whose input terminal is connected with the output terminal of the amplifier 24 and which is rotated in accordance with the output of the amplifier 24. $26_1$ is the shaft of the motor, while $26_2$ is the gear fixed on the motor shaft $26_1$. 31 is the film driving motor, while 33 is the A.C. source for driving the motor 31. 30 is the cone pulley fixed on the rotary shaft 34 to be driven by the motor 31. 29 is the cone pulley fixed on the rotary shaft 35 mechanically linked with the film driving mechanism $P_2'$ so as to control the film driving mechanism $P_2'$ of the cine-projector $P_2$, and 28 the endless belt provided between the cone pulleys 29 and 30, whereby by changing the position of the belt 28 in axial direction of the rotary shafts 30 and 35, the ratio of speed to be transmitted from the cone pulley 30 to the cone pulley 29 is continuously varied. 27 is the slider to be slid along the direction of arrow S, whereby the slider 27 includes a fork-shaped member $27_2$ in engagement with the belt 28 and a rack member $27_1$ in engagement with the gear $26_2$. 32 is a spring for urging the slider to the left in the drawing when the motor 26 is out of operation.

Below the operation of the synchronization system composed as mentioned above in accordance with the present invention will be explained.

In the case of this synchronization system, the Flip-Flop 23 is set when the sound pulses from the control track of the sound tape reproducer $T_2$ is put in the terminal 21, while the Flip-Flop is reset when the picture pulses from the cine-projector is put in the Flip-Flop through the terminal 22.

Thus the output of the Flip-Flop 23 is square shaped, and amplified by the amplifier 24, so as to be supplied to the film control motor 26. The motor 26 is connected with the slider 27 by means of the gear $26_2$ whereby the motor 26 rotates so as to move the slider 27 to the right against the force of the spring urging the slider 27 to the left. In this way, the position of the belt 28 is changed so as to change the ratio of transmission between the cone pulleys 29 and 30 and to change the film feeding speed of the film driving motor 31. The output of the Flip-Flop 23 is supplied to the film speed control motor 26 and therefore the belt 28 assumes the position at which the output of the film speed control motor 26 is brought in balance with the tension of the spring 32. The Flip-Flop 23 is set by means of the sound pulses as shown in (a) of FIG. 4 from the sound tape reproducer and reset by means of the picture pulses as shown in (b) of FIG. 4, so that, at the output terminal, the square shaped output as shown in (c) of FIG. 4 is produced so as to control the motor 26. If now for some reason the picture pulses b from the cine-projector are delayed in the producing phase, the width of the output pulses of the Flip-Flop 23 is changed so as to increase the mean current flowing through the motor 26 in such a manner that the position (the position of the slider) at which the output of the motor 26 is in balance with the force of the spring 32 is moved to the right, whereby the belt 28 is moved to the right accordingly. In this way, the ratio of the transmission between the cone pulleys 29 and 30 is changed in such a manner that the film feeding speed of the film driving motor 31, namely the number of rotations of the pulley 29 is increased in such a manner that the film driving mechanism $P_2$ feeds the film at a higher speed. When on the other hand, the picture pulses from the cine-projector are advanced in the phase, the mean current flowing through the film speed control motor 26 is decreased, whereby the slider 27 is moved to the left, the belt 28 is moved to the left in the drawing accordingly, the number of rotation of the pulley 29 is decreased and the film driving mechanism $P_2'$ feeds the film at a lower speed. By means of the repetition of the above mentioned processes, the synchronization is restored between the film and the sound tape so as to secure the synchronized operation. The maximum torque produced by the film driving motor 31 is set sufficiently larger than that used to rotate the motor 31 at the set film speed, while the cone pulleys 30 and 29 present a range of the variation of the transmission ratio sufficient for the synchronized operation of the cine-projector with the sound tape reproducer.

Figure 5:
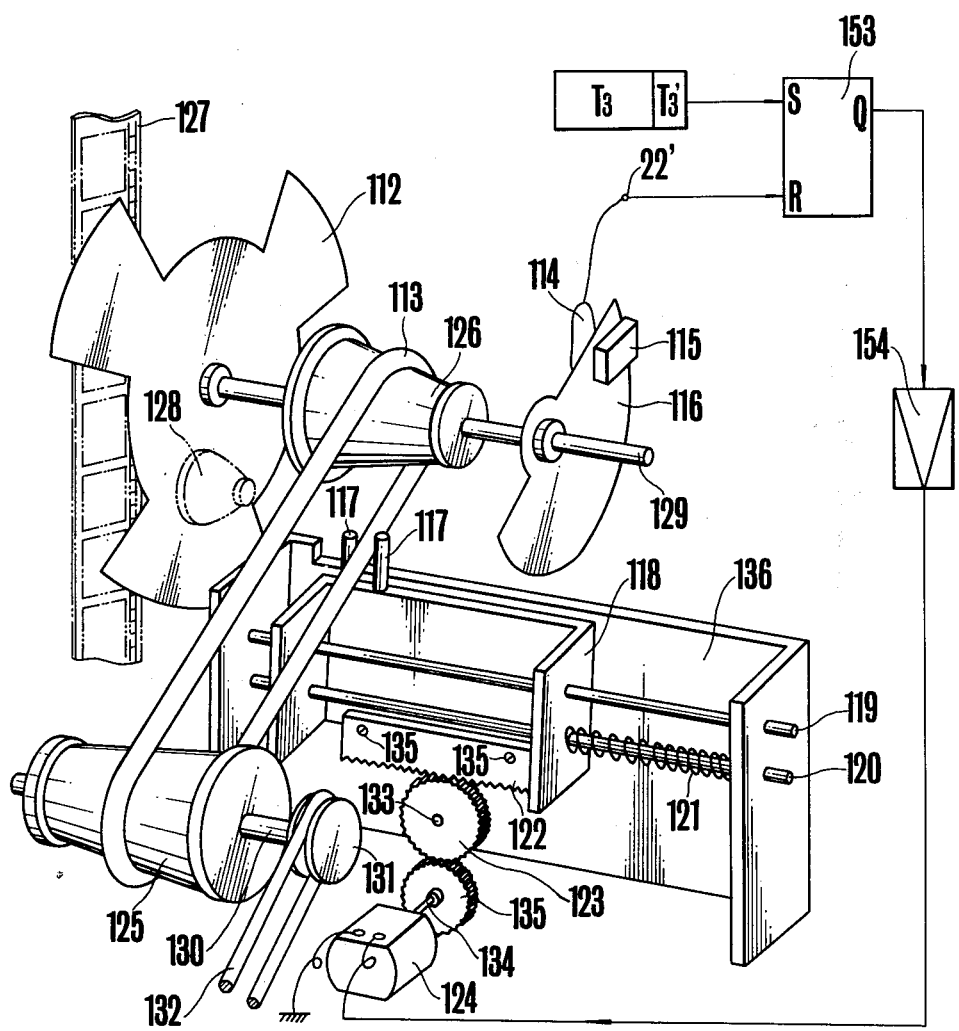
FIG. 5 shows the second embodiment of the synchronization system of the cine-projector with the sound tape reproducer in accordance with the present invention in perspective view, whereby the synchronization control mechanism in the cine-projector is shown in detail.

FIG. 5 shows the second embodiment of the synchronization system of the cine-projector with the sound tape reproducer in accordance with the present invention in perspective view, whereby the synchronization control mechanism in the cine-projector is shown in detail.

In FIG. 5, 125 is a cone pulley fixed on the rotary shaft 130, while 126 is another cone pulley fixed on the rotary shaft 129. 131 is a pulley fixed on the rotary shaft 130, 132 the endless belt provided between the pulley fixed on the motor shaft of the film driving motor (not shown in the drawing) and the pulley 131, whereby the belt 132 is intended to transmit the driving power of the film driving motor to the rotary shaft 130, so as to rotate the shaft 130. 113 is an endless belt provided between the cone pulleys 125 and 126, whereby the belt 113 is intended to transfer the rotation of the rotary shaft 130 to the rotary shaft 129 by means of the cone pulleys 125 and 126, being movable along the axial direction of the rotary shafts 129 and 130 in such a manner that according, as the belt 113 is moved to the right in the drawing, the transmission ratio of the rotation from the rotary shaft 130 to the rotary shaft 129 is increased. Thus, the number of rotations of the rotary shaft 129 is increased when the belt 113 is moved to the left in the drawing, the transmission ratio of the rotation from the rotary shaft 130 to the rotary shaft 129 is decreased and thus the number of rotations of the rotary shaft 129 is decreased. 112 is a rotary shutter blade fixed on the rotary shaft 129 while 116 is a semi-circular rotary disc. 114 is a switch while 115 is a permanent magnet whereby the switch 114 and the permanent magnet 115 are provided on both side of the semi-circular rotary disc 116, so as to be opposed to each other. When the semi-circular rotary disc 116 is situated between the switch 114 and the permanent magnet 115, the switch closed by the effect of the permanent magnet 115 is opened in such a manner that the pulses are produced by means of the closing and the opening of the switch 114. Further, the switch 114 is electrically connected to the reset terminal of the Flip-Flop circuit 153. $T_3$ is the sound tape reproducer, whereby the output terminal, at which the control pulses reproduced out of the control track is produced, is connected to the set terminal of the Flip-Flop circuit 153. 124 is the film speed control motor, whereby the film speed control motor 124 is electrically connected to the amplifier 154 so as to be supplied the square shaped pulses produced by the Flip-Flop 153 and to be rotated. 135 is the gear fixed on the shaft 134 of the film speed control motor 124 while 123 is the gear fixed on the rotary shaft 133 rotatably born in the device body, whereby the gear 123 is normally engaged with the gear 135. 136 is a fixed member secured on the device body, 119 and 120 the guide members fixed on the fixed member. 118 is a slider being guided by the guide member 119 and 120 so as to be slidable along the axial direction of the guide members 119 and 120, whereby a part of the slider 118 is provided with a translating member 117 for translating the belt 113 along the direction of the rotary shafts 129 and 130 in cooperation with the translation of the slider 118 and the rack member normally engaged with the gear 123, which rack member 122 is firmly connected to the slider 118 by means of the screw 135. 121 is the spring for urging the slider normally to the left in the drawing. 127 is the film, 128 the projecting lamp for projecting the picture information on the film to the screen, whereby between the film 127 and the projection lamp 128 the shutter blade 112 is provided in such a manner that by means of the rotation of the shutter blade 112 the light source, namely the projection lamp 128 for projecting the film 127, is selectively interrupted so as to make intermittent projection, which is a projection method quite conventional in the ordinary projector. Although not shown in FIG. 5, between the film 127 and the shutter blade 112 a film feeding means for intermittently feeding the film is provided whereby the film feeding means is mechanically linked with the rotary shaft 129 so as to be operated by the rotation of the shaft 129 while the film feeding is carried out at least when the shutter blade 112 interrupts the light from the projection lamp 128 to the film 127. Hereby the relation between the shutter blade 112 and the feeding means is establishd in advance in such a manner that one picture is fed per rotation of the rotary shaft 129.

Figure 6:
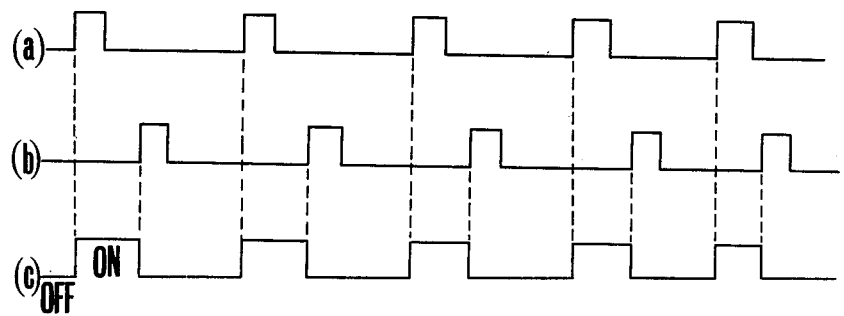
FIG. 6 shows wave forms for explaining the operation of the device shown in FIG. 5.

In the case of the second embodiment of the synchronization system composed as mentioned above in accordance with the present invention, the switch 114 is operated each time the semi-circular disc 116 passes between the switch 114 and the permanent magnet 115, whereby the switching frequency corresponds with the number of the fed pictures. Thus one pulse is produced with one operation of the switch 114 and put in the Flip-Flop circuit 153 so as to reset the Flip-Flop circuit 153. As explained above, the Flip-Flop 153 is set by means of the pulse from the sound tape reproducer $T_3$ so that at the output of the Flip-Flop 153 square shaped output is produced at the output terminal of the Flip-Flop 153 and amplified by the amplifier 154 so as to be applied to the film driving motor 125 shown in FIG. 5. The film speed control motor 124 is switched on while the Flip-Flop 153 is set, and switched off while the Flip-Flop 153 is reset. Hereby, the mean power P put in the film speed control motor 124 is represented as follows:

$$P = \frac{t_{on}}{t_{on} + t_{off}} \cdot \frac{VM^2}{R}$$

whereby $t$ on is the switching-on time, $t$ off the switching-off time, $VM$ the voltage applied to the motor, $R$ the then impedance of the motor and the belt 113 is moved into the position which corresponds with the value of $P$. As is clear from the above equation, the mean electrical power P varies in accordance with the variation of the applied voltage VM and by means of the mean power P the position of belt is varied. With reference to the value of VM, when the mean electrical power P is $VM^2/R$ due to the characteristics of the motor 124, the spring constant of the spring 121, the moment of inertia of the film driving system and so on, it is sufficient that the electrical power be in balance with the tension of the spring 121 so that the belt 113 may be situated near the right ends of the cone pulleys 125 and 126, whereby this value can be optionally taken within the maximum nominal voltage of the motor 124. FIG. 6 shows wave forms for explaining the operation of the device shown in FIG. 5, whereby $a$ is the pulses from the sound tape reproducer $T_3$, $b$ the pulses from the switch 114 of the cine-projector and $c$ the voltage to be applied to the film speed control motor 124. When a voltage as is shown by $c$ is applied to the motor, the motor produces a torque corresponding to the mean power, by means of which the position of the belt 113 is determined in such a manner that the transmission ratio between the cone pulleys 125 and 126 is determined.

If now for some reason the pulses from the cine-projector are delayed, the time $t$ on of $c$ in the drawing becomes longer while the time $t$ off becomes shorter. The time ($t$ on + $t$ off) is a cycle of the pulse from the sound tape reproducer $T_3$ and therefore constant, so that the width of the pulse of the square shaped output of the Flip-Flop 153 is increased and thus the mean electrical power is increased in such a manner that the belt 113 is translated to the right until the torque of the motor 124 is brought into balance with the tension of the spring 121. At this time, the film speed is synchronized with the tape speed in such a manner that a complete synchronization is established.

As explained above in the case of the synchronization system in accordance with the present invention, the film driving motor is always supplied with a constant electrical power, whereby the film speed is controlled by the film speed control motor so as to be synchronized with the tape speed, being kept constant although the number of rotation of the film driving motor, the load on the film driving system and so on are changed. In this way, the cine-projector and the sound tape reproduceer can be operated in remarkably stabilized synchronization.

What is claimed is:

1. An improvement in a synchronization system, comprising:
   1. sound tape reproducing apparatus for providing sound information, said apparatus including a signal generating means for producing a signal with a frequency corresponding to the tape speed;
   2. a control means having at least two input terminals for receiving the output signals respectively emitted from various signals generating sources and one output terminal for detecting the phase difference of said two signals respectively received in said two input terminals to provide the output signals corresponding to said phase difference, one input terminal of said apparatus adapted to receive the output signal corresponding to the signal generating means of said sound tape reproducing apparatus;
   3. a picture projection apparatus for providing picture information, said apparatus including:
      a driving means including a motor of substantially constant speed of revolution at all times, and a rotary shaft driven by said motor,
      a film feeding means,
      a signal generating means for producing signals with a frequency corresponding to the film feeding speed of said film feeding means, signals generated in said signal generating means adapted to be supplied to the other input terminal of said control means,
      a driven means having a rotary shaft to be actuated by a driving force of said driving means so as to operate said film feeding means;
   4. a means for transmitting the rotational motion of the rotary shaft mounted on said driving means to the rotary shaft of said driven means as well as for optionally varying the transmission ratio of the rotational motion, said means including:
      a pair of cone pulleys arranged to be inversely tapered off in a trapezoidal profile form with respect to each other, one of said cone pulleys being fixedly mounted on the rotary shaft of said driving means while the other of which is fixedly mounted on the rotary shaft of said driven means,
      an endless belt stretched around said two cone pulleys,
      a variable means for varying the position of said endless belt stretched around each of said cone pulleys; and
   5. an operating means for actuating said variable means corresponding to the output of said control means, said operating means having the input terminal connected with the output of said control means and an output terminal connected with the input terminal of said variable means.

2. A system in accordance with claim 1, wherein said variable means comprises an operative claw member for displacing the position of said endless belt stretched around said cone pulleys toward the axial direction of said cone pulleys with the help of the operative force of said operating means and a reset means for controlling said operative claw member to remove said endless belt again to the initial position thereof, stretching around said cone pulleys as soon as said operative force of said operating means exerted on said operative claw member is released.

3. A system in accordance with claim 2, wherein said operating means is provided with a motor to be rotated corresponding to the output of said control means.

4. A system in accordance with claim 3, wherein said operative claw member is provided with a rack, while said operating means has a toothed wheel gearing for transmitting the output of said motor to said operative claw member.

5. A system in accordance with claim 1, wherein said signals generated in a signal generating means of said sound tape reproducing apparatus as well as said signals generated in a signal generating means of said picture projection apparatus are in the form of pulse signal.

6. A system in accordance with claim 5, wherein said control means is provided with a flip-flop circuit, said flip-flop circuit having a set terminal thereof connected with the output terminal of said signal generating means of said sound tape reproducing apparatus and a reset terminal thereof connected with the output terminal of said signal generating means of said picture projection apparatus as well as the output terminal thereof connected with the input terminal of said operating means.

7. A system in accordance with claim 5, wherein said signal generating means of said picture projection apparatus is equipped with a permanent magnet and a switch adapted to be closed by virtue of the absorbing action of said permanent magnet as well as a rotary plate fixedly mounted on the rotary shaft of said driven means to be rotatable integrally with said rotary shaft and to be transversely movable intermittently between said permanent magnet and said switch when said rotary shaft is in motion so as to prevent the magnetic action of said permanent magnet from being exerted on said switch.

8. A motion picture projection apparatus capable of synchronizing a film feeding speed with the tape speed of a sound tape recording apparatus with reference to the standard pulses coming from a pulse generating means for producing standard pulses with a frequency corresponding to the tape speed mounted on said tape recording apparatus, comprising:
   a. a driving means having at least one rotatable driving axis;
   b. a film feeding means;
   c. a pulse generating means for producing pulses with a frequency corresponding to the film feeding speed of the film feeding means;
   d. a control means, said means having two input terminals thereof, one of which being adapted to receive the output pulse coming from the pulse generating means of said sound tape recording apparatus, the other of which being adapted to receive the output pulse coming from the pulse generating means of said apparatus as well as one output terminal thereof for detecting the pulse differences of said two pulse signals adapted to be respectively supplied to said two input terminals and for providing signals at the output therefrom for the time by the phase difference;

e. a driven means actuated by the driving force of said driving means to operate said film feeding means, said driven means having at least one rotary shaft arranged to be substantially in parallel with the rotatable driving axis of said driving means;

f. a power transmission means, said means including:
   a pair of cone pulleys arranged to be inversely tapered off to each other in a form of trapezoidal profile, one of which being fixedly mounted on the rotary shaft of said driven means, the other of which being fixedly mounted on the rotational driving axis of said driving means, and
   an endless belt stretched around said cone pulleys;

g. a power transmission ratio variable means capable of varying the power transmission ratio of said power transmission means, said variable means including:
   a displacing means for transferring said endless belt along said rotary shaft of said rotational driving axis; and
   a reset means for constantly exerting the action thereof on said displacing means so as to actuate said displacing means for again removing said endless belt to a predetermined position;

h. an operating means for forcedly transferring said displacing means toward another direction against the force energized by said reset means, said operating means being connected with the output terminal of said control means to be operative until the output of said control means is discontinued.

9. A motion picture projection apparatus in accordance with claim 8, wherein said pulse generating means is equipped with a permanent magnet and a switch adapted to be closed by virtue of the absorbing action of said permanent magnet as well as a rotary plate fixedly mounted on the rotary shaft of said driven means to be rotatable integrally with said rotary shaft and to be transversely movable intermittently between said permanent magnet and said switch when said rotary shaft is in motion so as to prevent the magnetic action of said permanent magnet from being exerted on said switch.

10. A motion picture projection apparatus in accordance with claim 8, wherein said operating means is provided with a motor to be rotated corresponding to the output of said control means.

11. A motion picture projection apparatus in accordance with claim 10, wherein said operative claw member is provided with a rack, while said operating means has a toothed wheel gearing for transmitting the output of said motor to said operative claw member.

* * * * *

UNITED STATES PATENT OFFICE
CERTIFICATE OF CORRECTION

Patent No. 4,066,963          Dated January 3, 1978

Inventor(s) Kiyoshi Takahashi et al

It is certified that error appears in the above-identified patent and that said Letters Patent are hereby corrected as shown below:

In the heading of the patent [45] should read as follows:

-- [45] January 3, 1978--.

Signed and Sealed this

Twenty-seventh Day of June 1978

[SEAL]

Attest:

RUTH C. MASON
*Attesting Officer*

DONALD W. BANNER
*Commissioner of Patents and Trademarks*